United States Patent [19]

Teunissen

[11] Patent Number: 5,388,466
[45] Date of Patent: Feb. 14, 1995

[54] FLOW METER

[76] Inventor: Theodora A. Teunissen, Kronenburgersingel 253, 6511 AS Nijmegen, Netherlands

[21] Appl. No.: 961,715
[22] PCT Filed: May 11, 1992
[86] PCT No.: PCT/EP92/01037
    § 371 Date: Jan. 12, 1993
    § 102(e) Date: Jan. 12, 1993
[87] PCT Pub. No.: WO92/21004
    PCT Pub. Date: Nov. 26, 1992

[30] Foreign Application Priority Data

May 14, 1991 [CH] Switzerland ............... 01440/91

[51] Int. Cl.⁶ .................................. G01F 1/10
[52] U.S. Cl. ........................ 73/861.33; 73/861.77
[58] Field of Search ........... 73/861.89, 861.92, 861.77, 73/861.33, 861.32, 861.35

[56] References Cited

U.S. PATENT DOCUMENTS

| 2,209,700 | 3/1938 | Mayo et al. |
| 3,036,460 | 5/1962 | White et al. |
| 3,217,539 | 4/1961 | Owen et al. ............ 73/861.77 |
| 3,240,063 | 3/1966 | Brueckner |
| 3,307,396 | 3/1967 | Griffo |
| 3,680,378 | 8/1972 | Aurilio et al. |
| 3,898,883 | 8/1975 | Kozak et al. |
| 4,393,723 | 7/1983 | Brand ..................... 73/861.89 |
| 4,395,919 | 8/1983 | Peters |
| 4,428,243 | 1/1984 | Taylor .................... 73/861.77 |
| 4,733,570 | 3/1988 | Peters .................... 73/861.33 |

FOREIGN PATENT DOCUMENTS

| 0031629 | 7/1981 | European Pat. Off. |
| 0228577 | 7/1987 | European Pat. Off. |
| 2047785 | 4/1972 | Germany |
| 8600403 | 1/1986 | WIPO .................. 73/861.92 |

Primary Examiner—Herbert Goldstein
Assistant Examiner—Harshad Patel
Attorney, Agent, or Firm—Cushman, Darby & Cushman

[57] ABSTRACT

The flow meter has in a substantially cylindrical inner housing (1) a helically designed diffuser (4), which imparts a swirl to the medium flowing through the inner housing. Downstream of the diffuser there is rotatably mounted a rotor (8), which has blades (13) extending from its rotational spindle (9) as well as a ring (14) which connects the blade ends to one another and is coaxial to the spindle. The rotor (8) is set in rotation by impingement of the blades (13) by the flowing medium. On the outer circumferential surface (15) of the ring (11) there is on a circular line a multiplicity of markings (16) arranged at equal angular intervals from one another. Through a window (18) in the inner housing (1), a light beam strikes the outer circumferential surface (15) of the ring (14), provided with the markings (16). Upon rotation of the rotor (8), the sequence of markings is transmitted by an optical-fibre cable (20) and sensed by a sensor (21), so that from the signals received the flow rate can be determined. The flow meter has the advantage that the medium to be measured does not have to be transparent as in the application of the light barrier and that the multiplicity of markings allows an increase in the measuring accuracy.

9 Claims, 1 Drawing Sheet

FLOW METER

The invention relates to a flow meter, and in particular, to a flow meter having a helical diffuser and a rotor for measuring volumetric flow of a medium.

A flow meter of the specified type is known, for example, from European Patent Specification 0,228,577. In the case of this flow meter, there is arranged upstream of the rotor, which is disposed in a flow passage for the medium, a helical diffuser for generating a swirl in order to impinge on axially parallel extending and circumferentially bent blades of the rotor which sets the latter in rotation. Each blade of the rotor has a window designed as an axially parallel slit. A beam of a light barrier directed at right angles to the rotor spindle, passes the window. The light source of the light barrier is arranged on one side and the light receiver being arranged on the opposite side of the rotor on the housing. This principle presupposes, however, that the medium of which the flow rate is to be measured is transparent to enable transmission of the light beam of the light barrier and thus, restricts its possible applications. In addition, the number of pulses to be received per rotor revolution for the measurement when blade windows are to be passed is restricted to three, due to blade overlapping.

Whereas the known flow meter operates reliably in applications with relatively great flow rates, at low flow rates it shows that it is not capable of supplying accurate measuring results.

The present invention is therefore based on the object of providing an inexpensively producible flow meter which, on account of accurate measuring results even at the smallest rates, can be used universally.

To achieve this object, the flow meter has a substantially cylindrical housing and a rotor coaxially mounted for rotation in the housing. The rotor includes curved blades having a full surface area. A helical diffuser is disposed in a passage of the housing with the passage being coaxially upstream of the rotor. The diffuser divides a flow medium flowing through the housing into a plurality of streams and generates a swirl so as to rotate the rotor by impinging the blades. A ring member is affixed to and surrounds outer ends of the blades. A signal generator is provided which interacts with the rotor to determine a flow rate of the medium.

The use of a ring on the rotor in combination with the impingement of the curved blades on their concave side brings about an increase in the response sensitivity of the same. The cause for this is likely to be an approximately complete utilization of the kinetic energy of the flow of which the throughput is to be measured. This takes place by preventing a radial flow-off in the blade region. In this case, due to the rigid anchoring of the blades, the ring can also be used for stiffening the blades at their outer ends. This allows the blade mass to be reduced without reducing the impinged surface area. Consequently, the overall mass of the rotor does not increase due to the mass of the ring.

The ring is expediently designed in one piece together with the blades and the rotor spindle, which benefits both the stiffness and the reduction in mass. Moreover, a rotor produced in one piece allows corresponding assembly costs to be avoided. According to a preferred further development of the flow meter according to the invention, the counting or measuring signals are obtained by scanning the outer surface of the rotor ring, provided with markings. Since the flow meter consequently does not have to keep a beam path clear for a light barrier, the form of the rotor is simplified. The universal applicability of the flow meter is further increased inter alia by the fact that the medium does not have to be transparent. Apart from this, virtually any number of signals can be generated per revolution.

Further details and advantages emerge from the following description, in which an embodiment of the flow meter is described in more detail purely by way of example with reference to the drawings, in which.

Figure 1:
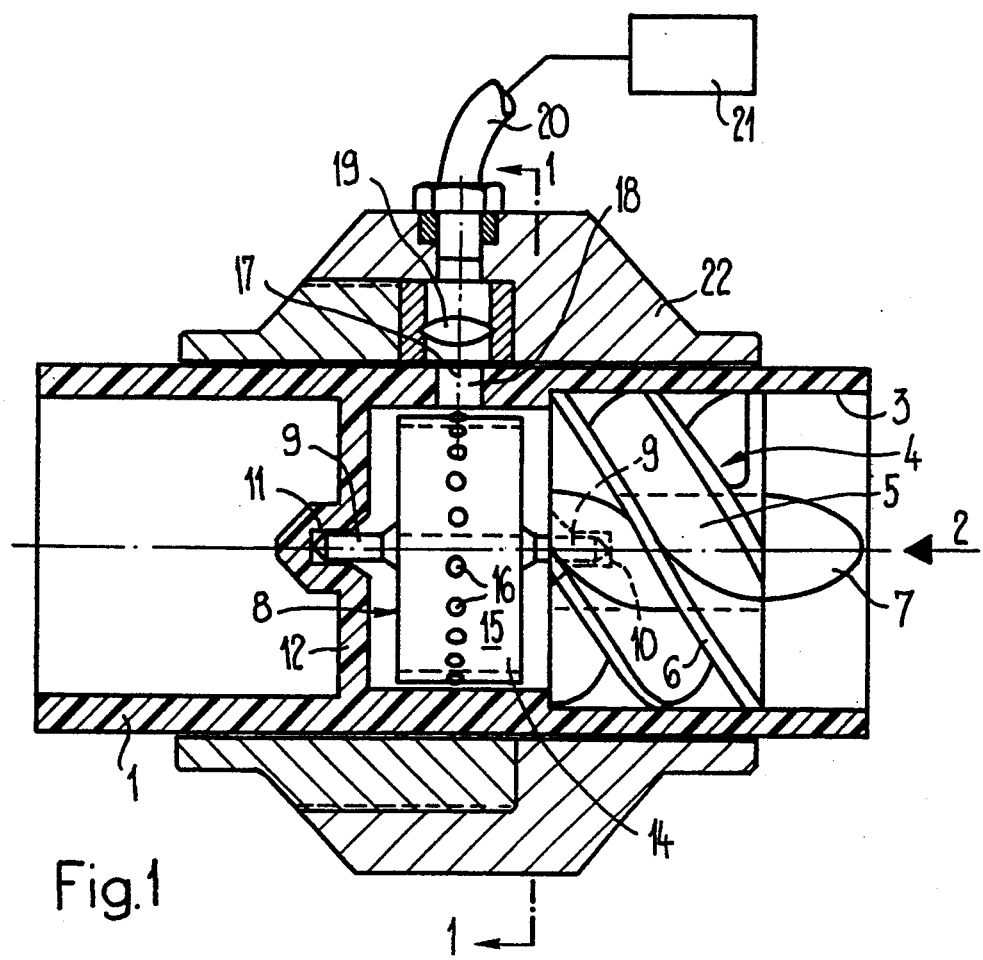
FIG. 1 shows a longitudinal section through a flow meter, on a scale enlarged approximately ten times.
Figure 2:
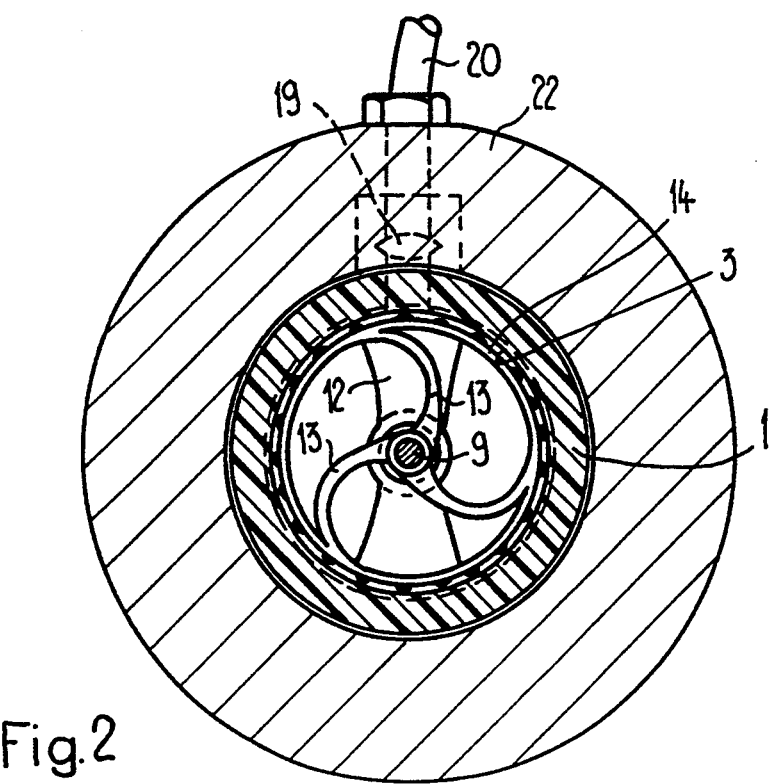
FIG. 2 shows a cross-section through the flow meter along the line 1—1 in FIG. 1.

The flow meter has an inner housing 1, which is of a tubular design, preferably consists of a plastic material and can be connected at both ends to hose lines. A liquid medium flows through the inner housing 1 in the direction of the arrow 2 from right to left. In the cylindrical passage 3 of the inner housing 1 there is arranged a diffuser 4, designed as a multi-thread screw or worm. An axial core 5, from which the threads 6 start, is extended forwards on the onflow side into a streamlined body 7. This diffuser divides the inflowing medium up into various part-streams, which thereby receive a swirling motion and are accelerated.

Arranged downstream of the diffuser 5 is a rotor 8. The rotor spindle 9 is mounted with play on the onflow side in a bore 10, formed in the core 5 of the diffuser 4. On the other side, the rotor spindle 9 is mounted, likewise with play, in a bore 11 which is formed in a narrow traverse 12, passing transversely through the passage 3.

Fastened on the rotor spindle 9 in axially parallel position are three identical blades 13 which are arranged circumferentially distributed and are curved over their extent about one or more, exclusively axially parallel axes of curvature. The thin-walled blades 13 have a full surface area and, in the exemplary embodiment represented, have an axial extent which remains constant over the radial extent. The ends of the blades are fastened on a cylindrical ring 14 coaxial to the rotor spindle 9. The ring 14 represented is of the same width as that of the blades 13, which corresponds to an advantageous configuration. However, the axial extent of the ring may be both greater than and less than that of the blades. Similarly, an axially symmetrical arrangement of the ring with respect to the blades is not necessary. An arrangement in which the ring is arranged offset in the axial direction in such a way that it leaves the blades clear on one side and projects axially over them to the other side may also be expedient. In any event, the ring has a full surface area and end faces lying in parallel radial planes.

The curvature of the rotor blades 13 is designed in such a way that the latter are impinged on their concavely curved side by the helical flow formed by the diffuser 5.

In any event, the rotor, comprising rotor spindle 9, blades 13 and ring 14, is expediently designed in one piece. Even with the thinnest-wall design of the blades and of the ring, this produces high strength and dimensional stability with the least rotor mass. At the same time, such a one-piece rotor can be produced with a relatively simple mould in an injection process, for example from plastic material, if the blades are curved only about axes which run parallel to the spindle of the rotor.

However, it is essential for the flow meter according to the invention, or the dynamic behavior thereof, that the configuration and/or arrangement of the ring 14 on the rotor enforces a flowing away of the medium in approximately axial direction and prevents any radial flowing away, in particular at the radially outer ends of the blades 13. Since clearance losses between rotor and surrounding passage are consequently already eliminated to a great extent, the flow energy of the medium is retained completely for the impingement of the blades. It has been shown that the impingement of the blades on the concave side, together with the ring, significantly increases the response sensitivity and plays a part in increasing the measuring accuracy, in particular at lower flow rates.

The clearance between rotor-ring 14 and the inner wall of the passage, which can be seen in the drawing, is of course not shown to scale in its radial dimension and in reality, is very narrow. By means of an inwardly protruding circumferential shoulder in the passage, which is arranged before or, as shown, after the ring (considered in the direction of flow), radial flowing away of the medium past the rotor is avoided to the greatest extent.

If the ring 14 extends in particular less far downstream than the blades 13, the inside diameter of the passage must be approximately the same as the inside diameter of the ring in order to avoid any radial flowing away of the medium.

On the outer circumferential surface 15 of the ring 14 there are formed or arranged a multiplicity of markings 16 on a circular line at equal angular intervals from one another. The markings are preferably depressions worked into the surface during production of the ring; color markings are also possible. The markings 16 are sensed when the rotor 8 is rotating by a light beam 17 directed against the outer surface 15 of the ring 14, for example by a laser beam which passes from outside through a window 18 in the inner housing 1 to strike the outer circumferential surface 15 of the ring 14 in the region of the markings 16 present there. When the rotor 8 is rotating, the light beam thus alternately strikes a marking 16 and the annular surface between the markings, and the light returned with varying intensity is focused by a lens 19 arranged externally in front of the window 18 and fed via a fiber optic cable 20 to a sensor 21. From the signals thus obtained, the flow rate per unit of time can be determined. The fiber optic cable 20 is connected to an outside housing 22, which can be screwed on and in which the lens 19 is also exchangeably arranged.

Devices for the emitting of a light radiator and for the optical sensing of the reflected light pulses are known. For example, the fiber optic cable 20 may have regions which are separate from one another in the longitudinal direction, one of which conducts the light beam directed against the rotor outer surface 15 and passes the returned light pulses through the other region to the optical sensor 21.

The advantage of this device is that, for the generation of signals, it is not dependent on the interruption of a light path and consequently allows a closed ring without windows, completely covering over the blades. Obviously, this device does not allow the generation of a number of signals per rotor revolution corresponding to the number of blades each having a window, but the generation of a multiplicity of signals corresponding to the number of markings present on the circumference of the ring. The significantly increased signal sequence allows the accuracy of the flow meter to be increased in certain applications. It is likewise of advantage that the flow meter described is also suitable for measuring the flow rate of any non-transparent medium.

Together with the great number of signals per revolution, the increased response sensitivity of the low-mass rotor produces extremely accurate measuring results in all areas of application.

I claim:

1. A flow meter comprising:
   a substantially cylindrical housing;
   a rotor coaxially mounted for rotation in said housing, said rotor including curved blades having a full surface area;
   a helical diffuser disposed in a passage of the housing coaxially upstream of said rotor for dividing a flow medium flowing through the housing into a plurality of streams and generating a swirl so as to rotate the rotor by impinging the blades;
   a ring member disposed coaxially with said rotor and affixed to and surrounding outer ends of said blades so as to be rotated with said blades through successive revolutions; and
   means for signal generation which interact with the rotor to determine a flow rate of the medium based upon the revolutions of said ring member.

2. A flow meter according to claim 1, wherein the ring has markings circumferentially distributed on an outer circumferential surface thereof, and the means for signal generation have light-beam focusing means as well as an optical sensor for the generation of signals for determining the flow rate.

3. A flow meter according to claim 1 or 2, wherein the blades of the rotor are axially parallel curved and the ring of full surface area extends over the width of the blades.

4. A flow meter according to claim 3, wherein the ring and the blades are designed in one piece.

5. A flow meter according to claim 3, wherein the ring is arranged symmetrically with respect to the blade width in an axial direction.

6. A flow meter according to claim 2, wherein the outer circumferential surface of the ring has a multiplicity of color markings arranged on a circular line at equal angular intervals.

7. A flow meter according to claim 2, wherein the markings are punctiform elevations.

8. A flow meter according to claim 1, wherein the housing is surrounded by an outer housing having a lens for focusing a light beam and having a connection for an optical-fibre cable, which connects the flow meter to an optical sensor.

9. A method of measuring a flow rate of a medium flowing through a passage, the passage including a rotor rotatably mounted therein, the rotor including blades, a ring member being affixed to ends of the blades, the ring member having markings distributed about a circumferential surface thereof, said method comprising the steps of:
   directing the flow medium past the rotor so as to rotate the rotor through successive revolutions;
   focusing a light beam on the markings of the ring member;
   sensing reflected light pulses produced by the rotating markings with an optical sensor; and
   determining a flow rate based upon an output signal of said optical sensor.

* * * * *